United States Patent [19]
Devaney, Jr.

[11] 3,834,640
[45] Sept. 10, 1974

[54] NORMALLY LOCKED SPINDLE MECHANISM UNLOCKABLE BY A COMPLIMENTARY CORE

[75] Inventor: Mark J. Devaney, Jr., Rochester, N.Y.

[73] Assignee: Eastman Kodak Company, Rochester, N.Y.

[22] Filed: July 23, 1973

[21] Appl. No.: 381,451

[52] U.S. Cl. .............................. 242/68.3, 242/71.8
[51] Int. Cl. ...................... B65h 17/02, B65h 75/02
[58] Field of Search ................ 242/68.3, 71.8, 210; 352/78 C; 95/90.5

[56] References Cited
UNITED STATES PATENTS
| | | | |
|---|---|---|---|
| 1,880,633 | 4/1932 | Wittel | 242/68.3 |
| 2,254,605 | 9/1941 | Foster | 242/68.3 |
| 3,474,753 | 10/1969 | Weyrich et al. | 242/71.8 X |

Primary Examiner—George F. Mautz
Attorney, Agent, or Firm—Mr. Steve W. Gremban

[57] ABSTRACT

An improved normally locked spindle mechanism for a photographic processing apparatus or the like for preventing rotation of a core mounted thereon containing a film that is incompatible with the processing chemistry of the apparatus. The spindle mechanism has a core code structure that is responsive only to a film code structure on a core mounted thereon containing a film of a type that is compatible with the processing chemistry of the apparatus. In such instances, the film code structure coacts with the core code structure to unlock the spindle mechanism, allowing rotation of the core and the unwinding and feeding of the film therefrom into the apparatus. The core code structure is selectively changeable to conform to the processing chemistry for which the processing apparatus is programmed.

10 Claims, 7 Drawing Figures

PATENTED SEP 10 1974　3,834,640
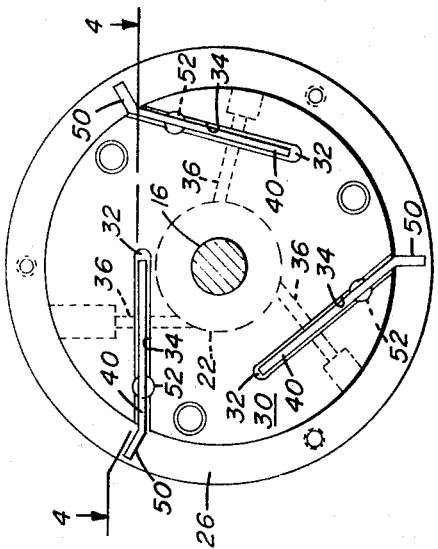
FIG. 3
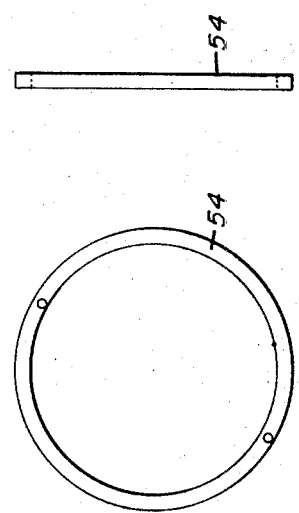
FIG. 7
FIG. 6
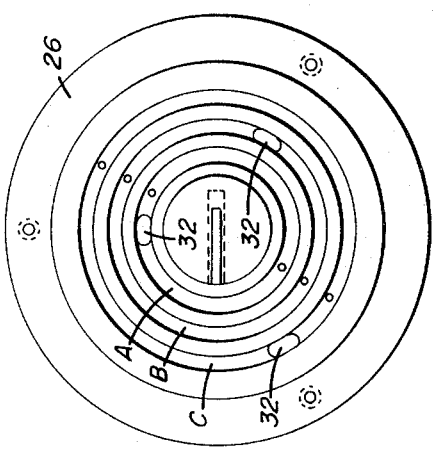
FIG. 2
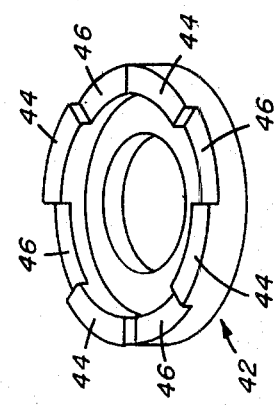
FIG. 5
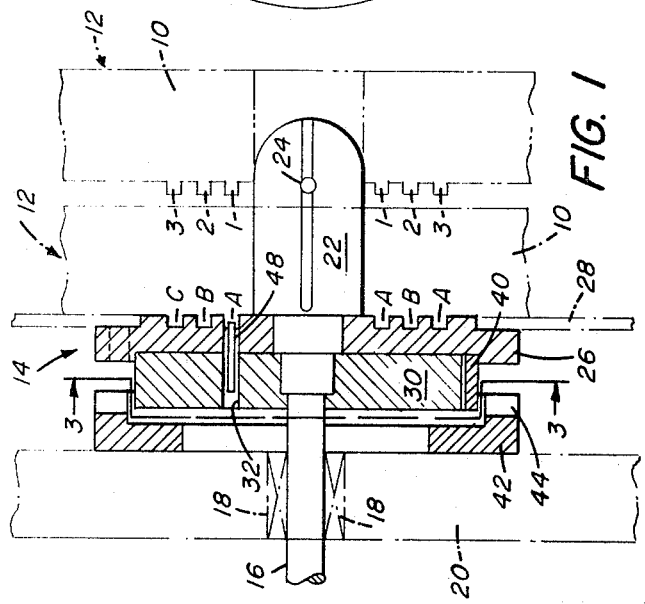
FIG. 1
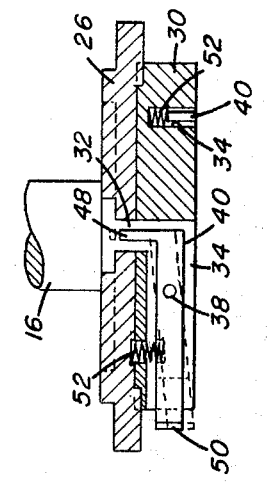
FIG. 4

3,834,640

NORMALLY LOCKED SPINDLE MECHANISM UNLOCKABLE BY A COMPLIMENTARY CORE

BACKGROUND OF THE INVENTION

1. Field of the Invention

This invention relates generally to spindle mechanisms, and more specifically to an improved normally locked spindle mechanism that is responsive to a coded core structure for unlocking the spindle.

2. Description of the Prior Art

A photographic processing apparatus of the type having a spindle mechanism for receiving a core containing a roll of exposed but unprocessed film is well known in the art. The film is fed from the core through the processing device where it is processed by a processing chemistry compatible with the film. Since such film is fed through the processing device under darkroom conditions, it is possible to inadvertently mount a core on the spindle containing film of a type that is incompatible with the processing chemistry. In such instances, the film is improperly processed and in many cases damaged or ruined.

It is further known as disclosed in commonly assigned U.S. Pat. application Ser. No. 216,554, now abandoned, to provide a spindle assembly and film core combination for use in a photographic film processing apparatus in which the spindle assembly includes a plate that either contains an annular groove or is otherwise adapted to cooperate with axial extensions on a core so that only one particular type of core can be placed on the spindle. The use of such a spindle assembly precludes errors in the placement of a core having one type of film to be processed onto a machine that is adapted to process a different type of photographic film.

It is further known as disclosed in U.S. Pat. No. 3,776,438 to provide a film discriminating and winding apparatus programmed to receive and condition film containers containing a predetermined type of film for removal of the film therefrom. The apparatus is programmed in one instance by mounting a coded take-up reel thereon designed to receive film of a predetermined type. The film containers such as cartridges are provided with film identifying indicia identifying the type of film contained therein, and the apparatus provided with an indicia or film sensing mechanism for sensing the type of film. The coded reel is mounted on the apparatus, and if the film in the cartridge matches the film for which the reel is coded, the apparatus is enabled for operation.

It is further known to provide a lockable spindle for a processing apparatus in which the spindle backing plate is provided with a groove for receiving a complimentary ring on a core. If the core ring and groove match indicating that the film is compatible with the processing chemistry, the core can be moved axially all the way in causing a member on the core to coact with a spindle lock mechanism to unlock the spindle. If the core ring and groove do not match indicating incompatibility between the film and processing chemistry, the core is prevented from moving all the way in and the member is prevented from coacting with the lock mechanism. Accordingly, the spindle remains locked.

Another type of lockable spindle for a processing apparatus is known in which the spindle backing plate is provided with one or more annular grooves for receiving complimentary rings on a core, and the grooves are provided with fluidic switches comprising air jets directed radially across the grooves. The fluidic switches are connected to any suitable logic circuit for controlling various functions such as a magnetic brake for the spindle, annunciators, web drive, or the like. If a core containing film compatible with the processing chemistry is mounted on the spindle, the core rings match the grooves and the air jets are interrupted actuating the fluidic switches causing the logic circuit to release the magnetic brake. If a core containing film incompatible with the processing chemistry is mounted on the spindle, the core rings and grooves do not match, and the air jets are uninterrupted. Accordingly, the logic circuit continues to energize the magnetic brake preventing the spindle from rotating.

The aforementioned spindle mechanisms suffer from one or more of the following disadvantages, among others. One, in the event the processing chemistry of the apparatus is changed, it is difficult and in some cases virtually impossible to readily or selectively alter the spindle mechanism and related circuitry so that the spindle is releasable only by cores containing a film compatible with the changed processing chemistry. Two, the spindle mechanisms and related circuitry are relatively expensive and complicated.

SUMMARY OF THE INVENTION

In accordance with a preferred embodiment of the invention, a spindle mechanism is disclosed for a photographic processing apparatus or the like that is normally in a locked condition to prevent rotation of the spindle and a core mounted thereon containing a film incompatible with the processing chemistry of the apparatus. Accordingly, the film cannot be unwound from the core and fed into the apparatus. The spindle mechanism is provided with selectively changeable core code means responsive to complimentary film code means on the core for unlocking the spindle if the core contains a film that is compatible with the selected processing chemistry. More specifically, the spindle mechanism is coded with a readily changeable core code designation or structure for indicating a number of different types of film for which the processing apparatus can be programmed to process, and cores containing the different types of film are provided with complimentary film code structures adapted to unlock the spindle when the correct core is mounted thereon. The selectively changeable code structure on the spindle mechanism comprises one or more radially-spaced annular concentric grooves on a spindle backing plate, and filler rings mountable in the grooves for altering the code. Lock levers extend into each groove, and a film code structure on the cores complimentary to the spindle core code structure comprises one or more radially spaced circular concentric rings insertable within the grooves for releasing the lock levers.

The primary advantage of the present invention is to provide an improved spindle mechanism for a processing apparatus or the like that positively prevents the feeding of a film into the apparatus which is incompatible with the processing chemistry for which the apparatus is programmed. This is achieved by providing a normally locked film spindle mechanism that prevents rotation of the spindle and a core mounted thereon containing a film incompatible with the processing chemistry of the apparatus. The spindle mechanism is provided with a selectively changeable core code structure alterable to respond to cores containing different types of film for unlocking the spindle. The cores contain different film code structures designating different types of film. When a core is mounted on the spindle mechanism containing a film code structure which is compatible with the selected core code structure, the spindle mechanism is unlocked to permit rotation of the spindle and transport of the film into the processing apparatus. However, any core containing a different film type, and a film code structure designating such different film, is unable to coact with the core code structure on the spindle mechanism for unlocking the spindle mechanism.

It is accordingly one of the objects and advantages of the present invention to provide an improved spindle mechanism that is normally locked, and has a core code structure thereon indicating the type of core and film for which the processing apparatus is programmed. The spindle mechanism is unlocked only when a core containing a complimentary film code structure and film is mounted on the spindle mechanism.

Another object and advantage of the invention is to provide a spindle mechanism having a selectively changeable core code structure to permit selecting one of several core code structures designating a selected processing chemistry for a predetermined type of film. When selected, the core code structure is responsive only to a compatible film code structure on a core containing the predetermined type of film for unlocking the spindle.

Another object and advantage of the invention is to provide an improved spindle mechanism for a processing apparatus or the like that substantially eliminates the feeding of a film into the apparatus that is incompatible with the processing chemistry.

Another object and advantage of the invention is to provide a spindle mechanism for a processing apparatus or the like that is of simple design and construction, thoroughly reliable and efficient in operation, and economical to manufacture.

The invention and its objects and advantages will become more apparent from the detailed description of the preferred embodiment presented below.

BRIEF DESCRIPTION OF THE DRAWING

In the detailed description of the preferred embodiment of the invention presented below, reference is made to the accompanying drawing, in which:

FIG. 1 is a side elevational view in section of a preferred embodiment of the spindle mechanism of this invention;

FIG. 2 is a front elevational view of the spindle mechanism of FIG. 1 with the core omitted for purposes of clarity;

FIG. 3 is a rear elevational view of the spindle mechanism of FIG. 1 taken substantially from line 3—3 of FIG. 1;

FIG. 4 is a section view taken substantially along line 4—4 of FIG. 3;

FIG. 5 is a perspective view of the fixed lock member of the spindle mechanism;

FIG. 6 is a top plan view of a code filler ring; and

FIG. 7 is a side elevational view of the ring of FIG. 6.

DESCRIPTION OF THE PREFERRED EMBODIMENT

Because spindle mechanisms for photographic processing apparatus or the like are well-known, the present description will be directed in particular to elements forming part of, or cooperating more directly with, apparatus in accordance with the present invention. Elements of spindle mechanisms and processing apparatus not specifically shown or described herein should be understood to be selectable from those known in the art.

With reference to the drawing, a preferred embodiment of the spindle mechanism of this invention is disclosed for use with a photographic film processing apparatus, not shown, or the like. In such application, individual strips of exposed customer film of one type are spliced together and wound onto a core 10 to form a master roll 12. The master roll of film is mountable on a spindle mechanism 14 from which it is fed into the photographic processing apparatus provided with a processing chemistry that is compatible with the type of film on the roll.

More specifically, with reference to FIG. 1 of the drawing, a freely rotatable shaft 16 of the spindle mechanism 14 is journaled for rotation in bearings 18 carried by a fixed support frame 20 preferably located at the input end of a photographic processing apparatus or the like. A core receiving spindle 22 is secured to one end of shaft 16, and is provided with any suitable spring-mounted detent or latch 24 for releasably securing a core 10, illustrated in two positions by broken lines in FIG. 1, on spindle 22 for rotation therewith. Also secured to shaft 16 for rotation therewith is a circular spindle backing plate 26 having a face engageable by one end of core 10 when the core is mounted on the spindle. An annular back-up flange 28, illustrated by broken lines in FIG. 1, may be secured by any suitable means to backing plate 26 to increase the diameter of the backing plate to support cores having a large diameter roll of film 12 mounted thereon.

A lock support means for the spindle mechanism 14 comprises a circular lock plate 30 secured to the rear surface of backing plate 26 by screws or the like for rotation therewith. The plates 26, 30 are provided with three separately aligned openings 32, as best illustrated in FIGS. 1, 2 and 4, extending therethrough and radially spaced varying distances from the center of the plates 26, 30. The openings in plate 26 terminate in annular grooves designated A, B and C in the front face of the backing plate which are radially spaced from the center of spindle 22 and shaft 16 the same distances as openings 32 as best illustrated in FIGS. 1 and 2. The openings 32 in plates 26, 30 terminate in deep elongated slots 34 (FIGS. 3 and 4) extending from openings 32 to the outer periphery of plate 30 parallel to a tangential line on spindle 22. The lock plate 30 is further provided with openings 36, shown dotted in FIG. 3, extending therethrough at right angles to the slots into which pins 38 (FIG. 4) are driven to provide pivots for lock levers 40. An annular lock member 42, as best illustrated in FIGS. 1 and 5, is secured by any suitable means to support frame 20, and is provided with a laterally extending peripheral lip having a plurality of laterally extending teeth 44 separated by recesses 46. Each lock lever 40 has a finger 48 at one end extending through plate opening 32 and into its corresponding annular groove A, B or C (FIGS. 1 and 4), and a lip 50 at the opposite end that extends into one of the recesses 46 in lock member 42. The lip 50 is bendable to properly position it relative to teeth 44 and recesses 46. A spring 52 is interposed between each lever 40 and plate 26 with ends thereof nesting in bores in the lever and plate as best illustrated in FIG. 4. Accordingly, in the normal position of each lock lever 40 indicated by dotted lines in FIG. 4, finger 48 extends into its corresponding annular groove, and lip 50 extends into a recess 46 in lock member 42 for locking the spindle mechanism 14. Any effort to rotate spindle 22 causes lip 50 to engage an adjacent tooth 44 and prevent further rotation of the spindle and core. Although three lock levers 40 and annular grooves A, B and C are illustrated in the exemplary application disclosed in the drawing, the invention need not be limited to such number but may encompass any suitable number of levers and grooves.

The radially spaced annular grooves A, B and C on the front face of backing plate 26 (FIGS. 1 and 2) provide a core code means usable to designate a type of core 10 and film 12 for which the processing apparatus is programmed to process. By providing filler rings 54 as illustrated in FIGS. 6 and 7 of the same radius as the annular grooves A, B and C, and which are insertable therein and releasably secured thereto by screws or the like for filling the grooves and releasing the corresponding lock levers 40, it is possible to selectively provide a number of different core code structures on backing plate 26. Each selected core code structure receives a complimentary film code structure on a core 10 containing the type of film for which the apparatus is programmed to process. The film code structure releases the lock levers to permit rotation of the spindle and feeding of the film into the processor. For example, let us assume that type "X" film requires a particular processing chemistry, and that the processing chemistry of the processing apparatus has been selected and the apparatus programmed to process only type "X" film. It is further assumed that the core code structure selected for type "X" film comprises three grooves A, B and C, and that all type "X" film is mounted on cores 10 designated by a film code structure comprising three radially spaced annular rings 1, 2 and 3 on the end thereof which match the selected core code structure. Accordingly, if a core 10 containing type "X" film designated by three rings 1, 2 and 3 is mounted on spindle 22 as illustrated by broken lines in FIG. 1, the rings will enter the grooves and push fingers 48 inwardly moving lock levers 40 to a released or unlocked position as seen in full lines in FIG. 4. In such position, spindle mechanism 14 is unlocked and may be rotated for unwinding the film from core 10 and feeding it into the processing apparatus. However, if a core 10 containing type "Y" film (designated, for example, by only two annular rings 1 and 3) is mounted on spindle 22, the two annular rings will enter grooves A and C and move their lock levers 40 to the unlocked position, but the remaining groove B will remain unfilled, and its corresponding lock lever 40 will remain in its normal locked position preventing rotation of spindle 22 and the feeding of the type "Y" film into the processing apparatus. Although the aforementioned three annular rings 1, 2 and 3 and corresponding grooves A, B and C respectively, or two annular rings 1 and 3 and corresponding grooves A and C respectively, may comprise two possible forms of complimentary code structures, many other forms of code structures comprising combinations of rings and corresponding grooves, filled or unfilled, are available. For example, the processing chemistry for the processing apparatus may be programmed to process type "Z" film only, and the core and film code designations for type "Z" film may comprise two annular rings 1 and 2 on core 10, corresponding annular grooves designated A and B on spindle plate 26, and outer groove designated C on the spindle plate filled by a filler ring 54. Accordingly, as illustrated in the following chart, if cores 10 containing film code structures all designating different types of film are mounted on the spindle mechanism 14, the only core 10 that will unlock the spindle mechanism is one having only two rings 1 and 2 complimentary to the annular grooves A and B. Any cores 10 having a ring 3 cannot unlock the spindle mechanism when mounted thereon since ring 3 will engage filler ring 54 and prevent any other rings 1 and/or 2 on the core from entering their corresponding grooves A and/or B respectively and releasing the lock levers 40 extending therein.

| | Core Code Designation for Type "Z" Film Grooves A and B Unfilled, Groove C filled | | |
|---|---|---|---|
| If Film Ring Code on Core Is: | Lock Levers Corresponding Thereto Are: | | Spindle Is: |
| No. 1 ring only | No. 1 unlocked | No. 2 locked | Locked |
| No. 2 ring only | No. 1 locked | No. 2 unlocked | Locked |
| No. 3 ring only | No entrance | No. 1 & No. 2 locked | Locked |
| No. 1 & No. 2 rings | No. 1 unlocked | No. 2 unlocked | FREE |
| No. 1 & No. 3 rings | No entrance | No. 1 & No. 2 locked | Locked |
| No. 2 & No. 3 rings | No entrance | No. 1 & No. 2 locked | Locked |
| No. 1 & No. 2 and No. 3 rings | No entrance | No. 1 & No. 2 locked | Locked |
| No Code | No. 1 locked | No. 2 locked | Locked |

The invention has been described in detail with particular reference to a preferred embodiment thereof, but it will be understood that variations and modifications can be effected within the spirit and scope of the invention as described hereinabove.

I claim:

1. In a normally locked spindle mechanism responsive to a core mounted thereon for unlocking said spindle mechanism, the combination comprising:
fixed support means;
spindle means rotatably supported by said support means for receiving a core mounted on said spindle means for rotation therewith, said spindle means having a recess;

means comprising a movable lever on said spindle means having a first portion thereof extending into said recess and a second portion thereof cooperating with said fixed support means for releasably locking said spindle means to prevent rotation of said spindle means and core as a unit, and the unwinding of film from the core; and means on said core complimentary to said recess and adapted when said core is mounted on said spindle means to extend into said recess and actuate said first portion of said lever causing said second portion to unlock said locking means whereby said spindle means and core can be rotated as a unit to allow unwinding of the film therefrom.

2. The invention according to claim 1 wherein said recess comprises an annular groove, and said means on said core comprises an annular ring insertable within said annular groove.

3. The invention according to claim 1 wherein said spindle means comprises a spindle onto which said core is mounted, and a backing plate secured to said spindle perpendicular thereto and engageable by one end of said core, said fixed support means comprises a projection, said lever is movable between a normally locked position in which said second portion is in locking engagement with said projection, and an unlocked position in which said second portion is free of said projection, said recess comprises an annular groove, and said means on said core comprises an annular ring on said one end of said core insertable within said annular groove for engaging said first portion and moving said lever to its unlocked position.

4. In an improved spindle mechanism for receiving a core mounted thereon, the combination comprising:
fixed support means;
spindle means rotatably supported by said support means for receiving a core mounted thereon for rotation therewith as a unit, said core having film code means thereon indicating the type of film wound on said core;
a lock member on said support means;
means for releasably locking said spindle means to said lock member to prevent rotation of said spindle means and core and the unwinding of film therefrom;
core code means on said spindle means cooperating with said film code means on a core when said core is mounted on said spindle means for unlocking said locking means only when said core code means and said film code means are complimentary; and
means for selectively changing said core code means to accommodate a range of said film code means whereby said spindle means can be unlocked for any selected film type.

5. The invention according to claim 4 wherein said locking means comprises a lock lever, said core code means comprises a recess defined by said spindle means into which a portion of said lock lever extends, and said film code means comprises a surface on said core for engaging and moving said portion of said lock lever for unlocking said locking means.

6. The invention according to claim 4 wherein said spindle means comprises a spindle rotatable about an axis and onto which said core is mounted, and a backing plate secured to said spindle perpendicular thereto and engageable by one end of said core; said locking means comprises a lock lever on said backing plate normally in locking engagement with said lock member, and movable between locked and unlocked positions; said core code means comprises a recess in said backing plate into which a portion of said lock lever extends; and said film code means comprises a surface on said core for engaging said portion of said lock lever when said core is mounted on said spindle and moving said lever to said unlocked position when said core code means and said film code means are complimentary.

7. The invention according to claim 6 wherein said recess is annular, and said film code means comprises an annular ring forming said core surface.

8. The invention according to claim 4 wherein said selectively changing core code means comprises a plurality of recesses defined by said spindle means, and complimentary inserts for filling one or more of said recesses.

9. The invention according to claim 4 wherein said spindle means comprises a spindle rotatable about an axis and onto which said core is mounted, and a backing plate secured to said spindle for rotation therewith and perpendicular thereto and engageable by one end of said core; said locking means comprises a plurality of lock levers on said backing plate radially spaced different distances from said axis and normally in locking engagement with said lock member, and movable between locked and unlocked positions; said core code means comprises a plurality of recesses in said backing plate radially spaced equivalent distances from said axis as said lock levers and into which corresponding portions of said lock levers extend, and said film code means comprises surfaces on said core for engaging said portions of said lock levers for moving said lock levers to their unlocked positions when said core code means and said film code means are complimentary.

10. The invention according to claim 9 wherein said recesses are annular, said selectively changing means for said core code means comprises filler rings insertable within one or more of said annular recesses for unlocking corresponding lock levers, and said film code means comprises annular rings forming said core surfaces.

* * * * *